(12) United States Patent
Hassan et al.

(10) Patent No.: US 9,397,723 B2
(45) Date of Patent: Jul. 19, 2016

(54) SPREAD SPECTRUM WIRELESS OVER NON-CONTIGUOUS CHANNELS

(71) Applicant: Microsoft Technology Licensing, LLC, Redmond, WA (US)

(72) Inventors: Amer A. Hassan, Kirkland, WA (US); Paul William Alexander Mitchell, Seattle, WA (US); Paul W. Garnett, Albany, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/468,699

(22) Filed: Aug. 26, 2014

(65) Prior Publication Data

US 2016/0065265 A1   Mar. 3, 2016

(51) Int. Cl.
| | |
|---|---|
| H04B 1/00 | (2006.01) |
| H04B 1/69 | (2011.01) |
| H04B 1/707 | (2011.01) |
| H04J 13/00 | (2011.01) |
| H04W 52/38 | (2009.01) |
| H04W 72/04 | (2009.01) |
| H04L 5/00 | (2006.01) |
| H04L 27/00 | (2006.01) |

(52) U.S. Cl.
CPC .................. *H04B 1/69* (2013.01); *H04B 1/707* (2013.01); *H04J 13/00* (2013.01); *H04J 13/0003* (2013.01); *H04W 52/38* (2013.01); *H04W 72/04* (2013.01); *H04L 5/0016* (2013.01); *H04L 27/0006* (2013.01)

(58) Field of Classification Search
CPC ....... A01B 12/006; H04B 1/69; H04W 72/04; H04W 52/38
See application file for complete search history.

(56) References Cited

U.S. PATENT DOCUMENTS

| | | | |
|---|---|---|---|
| 5,576,981 | A | 11/1996 | Parker et al. |
| 5,719,898 | A | 2/1998 | Davidovici et al. |
| 5,973,677 | A | 10/1999 | Gibbons |
| 6,266,685 | B1 | 7/2001 | Danielson et al. |
| 6,337,924 | B1 | 1/2002 | Smith |

(Continued)

FOREIGN PATENT DOCUMENTS

| | | |
|---|---|---|
| CN | 1825278 | 8/2006 |
| CN | 101388057 | 3/2009 |

(Continued)

OTHER PUBLICATIONS

Bohge, et al., "The Use of Guard Bands to Mitigate Multiple Access Interference in the OFDMA Uplink", in Proceedings of 13th International OFDM-Workshop, Aug. 2008, 5 Pages.

(Continued)

*Primary Examiner* — Dac Ha
(74) *Attorney, Agent, or Firm* — Sandy Swain; Micky Minhas

(57) ABSTRACT

Techniques for spread spectrum wireless over non-contiguous channels are described. In at least some embodiments, a set of channels is selected for wireless communication, with at least some of the channels being non-contiguous (e.g., non-adjacent) from one another. A spreading sequence is selected, such as based on attributes of a selected set of channels. Communication data that is to be transmitted over the set of channels is combined with the spreading sequence to generate a spread spectrum signal. The spread spectrum signal is then divided into multiple sub-signals for transmission over the set of channels.

20 Claims, 11 Drawing Sheets

(56) References Cited

U.S. PATENT DOCUMENTS

| | | |
|---|---|---|
| 6,442,764 B1 | 9/2002 | Badillo et al. |
| 6,691,176 B1 | 2/2004 | Narin et al. |
| 6,918,066 B2 | 7/2005 | Dutta et al. |
| 7,055,146 B1 | 5/2006 | Durr et al. |
| 7,151,795 B1 | 12/2006 | Goldburg |
| 7,437,193 B2 | 10/2008 | Parramon et al. |
| 7,535,874 B2 | 5/2009 | Ozluturk et al. |
| 7,623,121 B2 | 11/2009 | Dodge |
| 7,626,358 B2 | 12/2009 | Lam et al. |
| 7,639,876 B2 | 12/2009 | Clary et al. |
| 7,653,893 B2 | 1/2010 | Neumann et al. |
| 7,681,208 B1 | 3/2010 | Pantuso et al. |
| 7,853,646 B2 | 12/2010 | Black et al. |
| 7,921,430 B2 | 4/2011 | Johnson et al. |
| 7,953,295 B2 | 5/2011 | Vincent et al. |
| 8,090,225 B2 | 1/2012 | Lapstun et al. |
| 8,141,059 B2 | 3/2012 | Ding et al. |
| 8,175,613 B2 | 5/2012 | Patil et al. |
| 8,363,036 B2 | 1/2013 | Liang |
| 8,370,629 B1 | 2/2013 | Ngo et al. |
| 8,401,054 B2 | 3/2013 | Myers et al. |
| 8,432,939 B2 | 4/2013 | Bhattad et al. |
| 8,509,563 B2 | 8/2013 | Robinson et al. |
| 8,537,851 B1 | 9/2013 | Gossett et al. |
| 8,606,293 B2 | 12/2013 | Kim et al. |
| 8,634,386 B2 | 1/2014 | Jagger et al. |
| 8,634,849 B2 | 1/2014 | Jovicic et al. |
| 8,639,266 B2 | 1/2014 | Zelinka |
| 8,655,944 B2 | 2/2014 | Silbey et al. |
| 8,700,060 B2 | 4/2014 | Huang |
| 2001/0009545 A1 | 7/2001 | Schilling |
| 2002/0015437 A1 | 2/2002 | Li et al. |
| 2002/0036253 A1 | 3/2002 | Lake |
| 2002/0186710 A1* | 12/2002 | Alvesalo et al. .............. 370/468 |
| 2002/0187799 A1 | 12/2002 | Haartsen |
| 2003/0061283 A1 | 3/2003 | Dutta et al. |
| 2003/0072467 A1 | 4/2003 | Brundage et al. |
| 2003/0088716 A1 | 5/2003 | Sanders |
| 2003/0110296 A1 | 6/2003 | Kirsch et al. |
| 2003/0126311 A1 | 7/2003 | Kushnirskiy et al. |
| 2003/0132916 A1 | 7/2003 | Kramer |
| 2003/0179731 A1* | 9/2003 | Noguchi et al. .............. 370/331 |
| 2004/0027387 A1 | 2/2004 | Nason et al. |
| 2004/0031030 A1 | 2/2004 | Kidder et al. |
| 2004/0100457 A1 | 5/2004 | Mandle |
| 2004/0120290 A1* | 6/2004 | Makhijani et al. ............. 370/335 |
| 2005/0094604 A1 | 5/2005 | Ozluturk et al. |
| 2005/0157459 A1 | 7/2005 | Yin et al. |
| 2005/0240949 A1 | 10/2005 | Liu et al. |
| 2005/0281321 A1 | 12/2005 | Bergstrom et al. |
| 2006/0189353 A1* | 8/2006 | Fujishima ............. H04W 88/08 455/561 |
| 2006/0197755 A1 | 9/2006 | Bawany |
| 2006/0238510 A1 | 10/2006 | Panotopoulos et al. |
| 2006/0270351 A1 | 11/2006 | Lastinger et al. |
| 2007/0022390 A1 | 1/2007 | Hillis et al. |
| 2007/0051766 A1 | 3/2007 | Spencer |
| 2007/0147226 A1 | 6/2007 | Khandekar et al. |
| 2007/0174846 A1 | 7/2007 | Johnson et al. |
| 2007/0180441 A1 | 8/2007 | Ding et al. |
| 2007/0247338 A1 | 10/2007 | Marchetto |
| 2007/0283048 A1 | 12/2007 | Theimer et al. |
| 2007/0297323 A1 | 12/2007 | Seki |
| 2008/0024502 A1 | 1/2008 | Nagahara et al. |
| 2008/0077855 A1 | 3/2008 | Lev et al. |
| 2008/0077941 A1 | 3/2008 | Holmes et al. |
| 2008/0104233 A1 | 5/2008 | Smith et al. |
| 2008/0104580 A1 | 5/2008 | Wilkinson |
| 2008/0165754 A1 | 7/2008 | Hu |
| 2008/0180411 A1 | 7/2008 | Solomon et al. |
| 2008/0215796 A1 | 9/2008 | Lam et al. |
| 2008/0232061 A1 | 9/2008 | Wang et al. |
| 2008/0309636 A1 | 12/2008 | Feng et al. |
| 2009/0007001 A1 | 1/2009 | Morin et al. |
| 2009/0102794 A1 | 4/2009 | Lapstun et al. |
| 2009/0187879 A1 | 7/2009 | Ao et al. |
| 2009/0201850 A1 | 8/2009 | Davis et al. |
| 2009/0217241 A1 | 8/2009 | Motoyama et al. |
| 2009/0241020 A1 | 9/2009 | Hsiao |
| 2009/0250366 A1 | 10/2009 | Esfahani |
| 2010/0001963 A1 | 1/2010 | Doray et al. |
| 2010/0021022 A1 | 1/2010 | Pittel et al. |
| 2010/0075517 A1 | 3/2010 | Ni et al. |
| 2010/0146488 A1 | 6/2010 | Chen et al. |
| 2010/0188338 A1 | 7/2010 | Longe |
| 2010/0231556 A1 | 9/2010 | Mines et al. |
| 2010/0245221 A1 | 9/2010 | Khan |
| 2011/0066973 A1 | 3/2011 | Plom et al. |
| 2011/0083126 A1 | 4/2011 | Bhakta et al. |
| 2011/0093773 A1 | 4/2011 | Yee |
| 2011/0164813 A1 | 7/2011 | Enomoto |
| 2011/0183678 A1* | 7/2011 | Kerpez ............... H04W 24/06 455/450 |
| 2011/0225490 A1 | 9/2011 | Meunier |
| 2011/0234502 A1 | 9/2011 | Yun et al. |
| 2011/0248941 A1 | 10/2011 | Abdo et al. |
| 2012/0071189 A1* | 3/2012 | Mody .................... 455/513 |
| 2012/0084345 A1 | 4/2012 | Silbey |
| 2012/0087078 A1 | 4/2012 | Medica et al. |
| 2012/0106082 A1 | 5/2012 | Wu et al. |
| 2012/0108180 A1 | 5/2012 | Shibuya |
| 2012/0170966 A1 | 7/2012 | Novak, Jr. |
| 2012/0173226 A1 | 7/2012 | McEvoy et al. |
| 2012/0174224 A1 | 7/2012 | Thomas et al. |
| 2012/0180002 A1 | 7/2012 | Campbell et al. |
| 2012/0189203 A1 | 7/2012 | Lin et al. |
| 2012/0192155 A1 | 7/2012 | Silbey et al. |
| 2012/0249300 A1 | 10/2012 | Avital et al. |
| 2012/0263118 A1 | 10/2012 | Love |
| 2012/0270537 A1 | 10/2012 | Weng et al. |
| 2013/0050922 A1 | 2/2013 | Lee et al. |
| 2013/0093388 A1 | 4/2013 | Partovi |
| 2013/0106723 A1 | 5/2013 | Bakken et al. |
| 2013/0179798 A1 | 7/2013 | Korupolu |
| 2013/0191715 A1 | 7/2013 | Raskovic et al. |
| 2013/0229386 A1 | 9/2013 | Bathiche |
| 2013/0242762 A1 | 9/2013 | Bennett et al. |
| 2013/0279098 A1 | 10/2013 | Cho |
| 2013/0288516 A1 | 10/2013 | Chang et al. |
| 2013/0301200 A1 | 11/2013 | Leung |
| 2013/0322423 A1* | 12/2013 | Park et al. .................... 370/342 |
| 2013/0335330 A1 | 12/2013 | Lane |
| 2013/0335902 A1 | 12/2013 | Campbell |
| 2013/0335903 A1 | 12/2013 | Raken |
| 2013/0342465 A1 | 12/2013 | Bathiche |
| 2013/0346636 A1 | 12/2013 | Bathiche |
| 2014/0028635 A1 | 1/2014 | Krah |
| 2014/0029183 A1 | 1/2014 | Ashcraft et al. |
| 2014/0036430 A1 | 2/2014 | Wroblewski et al. |
| 2014/0061406 A1 | 3/2014 | Chevalier et al. |
| 2014/0080501 A1 | 3/2014 | Lee et al. |
| 2014/0094165 A1 | 4/2014 | Karlsson et al. |
| 2014/0098485 A1 | 4/2014 | Vahid |
| 2014/0104279 A1 | 4/2014 | Albrecht |
| 2014/0117928 A1 | 5/2014 | Liao |
| 2014/0128091 A1 | 5/2014 | Engström |
| 2014/0173402 A1 | 6/2014 | Bastide et al. |
| 2014/0187288 A1 | 7/2014 | Correll, Jr. |
| 2014/0328194 A1* | 11/2014 | Sen et al. .................... 370/252 |
| 2014/0341056 A1 | 11/2014 | Carbajal |
| 2015/0085683 A1 | 3/2015 | Sadek et al. |
| 2016/0034001 A1 | 2/2016 | Huston et al. |
| 2016/0042070 A1 | 2/2016 | Rossi et al. |
| 2016/0050529 A1 | 2/2016 | Hassan et al. |
| 2016/0055374 A1 | 2/2016 | Zhang et al. |
| 2016/0055659 A1 | 2/2016 | Wilson et al. |
| 2016/0056916 A1 | 2/2016 | Hassan et al. |
| 2016/0073267 A1 | 3/2016 | Hassan et al. |

FOREIGN PATENT DOCUMENTS

| | | |
|---|---|---|
| CN | 101650659 | 2/2010 |
| CN | 101685487 | 3/2010 |
| CN | 101799855 | 8/2010 |

(56) References Cited

FOREIGN PATENT DOCUMENTS

| | | |
|---|---|---|
| CN | 102855232 | 1/2013 |
| DE | 202011103087 | 8/2011 |
| EP | 0611498 | 8/1994 |
| GB | 2178570 | 2/1987 |
| KR | 20030000579 | 1/2003 |
| NL | 1038411 | 5/2012 |
| WO | WO-0158098 | 8/2001 |
| WO | WO-02069533 | 9/2002 |
| WO | WO-2009139789 | 11/2009 |
| WO | WO-2010011983 | 1/2010 |
| WO | WO-2010048746 | 5/2010 |
| WO | WO-2012171729 | 12/2012 |
| WO | WO-2013010323 | 1/2013 |

OTHER PUBLICATIONS

Kang, et al., "An Opportunistic Indoors Positioning Scheme Based on Estimated Positions", in Proceedings: IEEE Symposium on Computers and Communications, Jul. 5, 2009, 7 Pages.
Yucek, et al., "A Survey of Spectrum Sensing Algorithms for Cognitive Radio Applications", in Proceedings: IEEE Communications Surveys & Tutorials, vol. 11 No. 1, Jan. 1, 2009, 15 pages.
"ABBYY FineReader", Available at: http://www.softexia.com/office-tools/abbyy-finereader/, Jul. 11, 2013, 10 pages.
"Cholesteric Liquid Crystal", Retrieved from: <http://en.wikipedia.org/wiki/Cholesteric_liquid_crystal> on Aug. 6, 2012, Jun. 10, 2012, 2 pages.
"Chronoscan", Available at: http://www.chronoscan.org/index.php?lang=en, Jan. 26, 2013, 3 pages.
Final Office Action, U.S. Appl. No. 12/897,947, Dec. 19, 2012, 8 pages.
Final Office Action, U.S. Appl. No. 13/010,552, Sep. 26, 2013, 22 pages.
Final Office Action, U.S. Appl. No. 13/010,552, Oct. 23, 2014, 22 pages.
Final Office Action, U.S. Appl. No. 13/603,918, Mar. 21, 2014, 14 pages.
Foreign Office Action, CN Application No. 201210018531.4, Feb. 28, 2015, 12 pages.
Foreign Office Action, CN Application No. 201210018531.4, Jun. 4, 2014, 16 pages.
"How and Why Would Anyone Validate Their Code", Retrieved from: <http://designreviver.com/articles/how-and-why-would-anyone-validate-their-code/> on Nov. 11, 2010, Aug. 25, 2010, 9 pages.
"HP Code Advisor Version C.02.15 User's Guide", Hewlett-Packard Development Company L.P., Available at <http://docs.hp.com/en/14242/Cadvise_UG.pdf>, Jan. 2010, pp. 1-72.
"i-Interactor electronic pen", Retrieved from: <http://www.alibaba.com/product-gs/331004878/i_Interactor_electronic_pen.html> on Jun. 19, 2012, 5 pages.
International Search Report and Written Opinion, Application No. PCT/US2013/044871, Aug. 14, 2013, 12 pages.
International Search Report and Written Opinion, Application No. PCT/US2015/022349, Jun. 25, 2015, 9 Pages.
International Search Report and Written Opinion, Application No. PCT/US2013/044873, Nov. 22, 2013, 9 pages.
International Search Report and Written Opinion, Application No. PCT/US2012/021004, Jul. 30, 2012, 9 pages.
International Search Report and Written Opinion, Application No. PCT/US2013/045049, Sep. 16, 2013, 9 pages.
"Introducing OmniPage Cloud Service", Available at: http://www.nuance.com/for-business/by-product/omnipage/omnipage-cloud-services/index.htm, Sep. 4, 2012, 3 pages.
"MPC Fly Music Production Controller", AKAI Professional, Retrieved from: <http://www.akaiprompc.com/mpc-fly> on Jul. 9, 2012, 4 pages.
"neXus Charging Cradle", Retrieved from <http://www.gen-xtech.com/neXus.php> on Jul. 28, 2014, Apr. 17, 2012, 2 pages.
Non-Final Office Action, U.S. Appl. No. 12/897,947, Jun. 7, 2012, 7 pages.

Non-Final Office Action, U.S. Appl. No. 13/010,552, May 8, 2015, 27 pages.
Non-Final Office Action, U.S. Appl. No. 13/010,552, Jul. 8, 2014, 22 pages.
Non-Final Office Action, U.S. Appl. No. 13/010,552, Aug. 12, 2013, 20 pages.
Non-Final Office Action, U.S. Appl. No. 13/603,918, Dec. 19, 2013, 12 pages.
Notice of Allowance, U.S. Appl. No. 12/897,947, Oct. 8, 2013, 8 pages.
"OmniPage Standard 18", Available at: http://ocr-software-review.toptenreviews.com/omnipage-standard-review.html, Oct. 27, 2010, 3 pages.
"Pearl scan solutions", Available at: http://www.pearl-scan.co.uk/document-conversion/OCR-conversion.php, Aug. 21, 2008, 2 pages.
"Rechargeable Stylus Pen", Retrieved from <http://www.e-pens.com/uk/rechargeable-stylus-pen.html> on Jul. 28, 2014, Jul. 5, 2013, 1 pages.
"Reflex LCD Writing Tablets", retrieved from <http://www.kentdisplays.com/products/lcdwritingtablets.html> on Jun. 27, 2012, 3 pages.
Restriction Requirement, U.S. Appl. No. 13/603,918, Nov. 27, 2013, 8 pages.
Restriction Requirement, U.S. Appl. No. 12/897,947, May 11, 2012, 7 pages.
"ScanSnap ix500 Scanning into Excel", Retrieved on: Feb. 20, 2014, Available at: http://www.youtube.com/watch?v=PvpH4NAzUjM, 2 pages.
"Scansnap", Available at: http://scanners.fcpa.fujitsu.com/scansnapit/scansnap-ix500.php, Jan. 11, 2013, 4 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"Understanding the Compatibility View List", Retrieved From: <http://msdn.microsoft.com/en-us/library/dd567845(v=vs.85).aspx> Jun. 11, 2014, Mar. 2011, 5 Pages.
"Visual Basic 6.0 Code Advisor", Retrieved from: <http://msdn.microsoft.com/en-us/vbasic/ms789135.aspx> on Nov. 11, 2010, 2006, 2 pages.
"Web Site Maintenance Tools, Software", Retrieved from: <http://websitetips.com/tools/> on Nov. 11, 2010, 10 pages.
"Write & Learn Spellboard Advanced", Available at <http://somemanuals.com/VTECH,WRITE%2526LEARN—SPELLBOARD—ADV—71000,JIDFHE.PDF>, 2006, 22 pages.
Bathiche,"Input Device with Interchangeable Surface", U.S. Appl. No. 13/974,749, Aug. 23, 2013, 51 pages.
Chapman,"Review of Cross-Browser Testing Tools", Retrieved From: <http://www.smashingmagazine.com/2011/08/07/a-dozen-cross-browser-testing-tools/> Jun. 9, 2014, Aug. 7, 2011, 13 pages.
Choudhary,"CROSSCHECK: Combining Crawling and Differencing to Better Detect Cross-browser Incompatibilities in Web Applications", in Proceedings: IEEE Fifth International Conference on Software Testing, Verification and Validation, Apr. 17, 2012, 10 Pages.
Choudhary,"Detecting Cross-browser Issues in Web Applications", in Proceedings: The 33rd International Conference on Software Engineering, May 21, 2011, 3 Pages.
Kim,"Chrome Extensions for Web Development", Retrieved from: <http://googlecode.blogspot.com/2010/05/chrome-extensions-for-web-development.html> on Nov. 11, 2010, May 27, 2010, 4 pages.
Kristianto,"Cross Browser Compatibility Check Tools", Retrieved from: <http://www.ivankristianto.com/web-development/designs/cross-browser-compatibility-check-tools/1202/> on Nov. 11, 2010, Jan. 26, 2010, 14 pages.
Lane,"Media Processing Input Device", U.S. Appl. No. 13/655,065, Oct. 18, 2012, 43 pages.
Mesbah,"Automated Cross-Browser Compatibility Testing", in Proceedings: the 33rd International Conference on Software Engineering, May 21, 2011, 10 Pages.

(56) References Cited

OTHER PUBLICATIONS

Qin,"pPen: Enabling Authenticated Pen and Touch Interaction on Tabletop Surfaces", in Proceedings of ITS 2010, Available at <http://www.dfki.de/its2010/papers/pdf/po172.pdf>, Nov. 2010, pp. 283-284.
Ross,"IE9 Compat Inspector", Retrieved From: <http://blogs.msdn.com/b/ie/archive/2011/04/27/ie9-compat-inspector.aspx> Jun. 11, 2014, Apr. 27, 2011, 7 Pages.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Van"Lenovo Thinkpad Tablet 2 Review", Retrieved from: <http://www.digitaltrends.com/tablet-reviews/lenovo-thinkpad-tablet-2-review/> Jan. 29, 2014, Feb. 12, 2013, 7 Pages.
Final Office Action, U.S. Appl. No. 13/010,552, Oct. 9, 2015, 30 pages.
"FOLDOC: Free On-Line Dictionary of Computing, definition for "Exception"", Retrieved from the Internet: http://web.archive.org/web/20100615211114/http://foldoc.org/exception, 1 page.
Foreign Office Action, CN Application No. 201210018531.4, Sep. 6, 2015, 13 pages.
International Search Report and Written Opinion, Application No. PCT/US2015/045985, Oct. 30, 2015, 10 Pages.
International Search Report and Written Opinion, Application No. PCT/US2015/044402, Nov. 9, 2015, 10 pages.
International Search Report and Written Opinion, Application No. PCT/US2015/045780, Oct. 22, 2015, 11 pages.
International Search Report and Written Opinion, Application No. PCT/US2015/048218, Dec. 2, 2015, 11 pages.
International Search Report and Written Opinion, Application No. PCT/US2015/042551, Oct. 6, 2015, 13 Pages.
International Search Report and Written Opinion, Application No. PCT/US2015/044944, Nov. 11, 2015, 13 pages.
International Search Report and Written Opinion, Application No. PCT/US2015/045778, Dec. 15, 2015, 15 pages.
International Search Report and Written Opinion, Application No. PCT/US2015/045468, Oct. 29, 2015, 9 Pages.
Non-Final Office Action, U.S. Appl. No. 14/450,023, Sep. 25, 2015, 18 pages.
Non-Final Office Action, U.S. Appl. No. 14/462,820, Dec. 21, 2015, 33 pages.
Non-Final Office Action, U.S. Appl. No. 14/477,014, Sep. 29, 2015, 18 pages.
Embley,"Table-Processing Paradigms: A Research Survey", International Journal of Document Analysis and Recognition, vol. 8, No. 2-3, May 9, 2006, pp. 66-86.
Gao,"View: Visual Information Extraction Widget for Improving Chart Images Accessibility", Sep. 30, 2012, 4 pages.
Mishchenko,"Chart image understanding and numerical data extraction", Sixth International Conference on Digital Information Management (ICDIM), Sep. 26, 2011, 20 pages.
Sadek,"Method and Apparatus for Performing Carrier Sense Adaptive Transmission in Unlicensed Spectrum", U.S. Appl. No. 61/981,608, filed Apr. 18, 2014, 41 pages.
Savva,"ReVision: Automated Classification, Analysis and Redesign of Chart Images", Oct. 16, 2011, 10 pages.
Final Office Action, U.S. Appl. No. 14/450,023, Feb. 2, 2016, 25 pages.
Foreign Notice of Allowance, CN Application No. 201210018531.4, Feb. 4, 2016, 7 pages.
Non-Final Office Action, U.S. Appl. No. 14/465,307, Jan. 29, 2016, 8 pages.
Second Written Opinion, U.S. Appl. No. PCT/US2015/044402, Apr. 6, 2016, 4 pages.
Final Office Action, U.S. Appl. No. 14/477,014, Jun. 8, 2016, 20 pages.
Final Office Action, U.S. Appl. No. 14/462,280, May 20, 2016, 34 pages.

\* cited by examiner

SPREAD SPECTRUM WIRELESS OVER NON-CONTIGUOUS CHANNELS

BACKGROUND

Many devices today utilize some form of wireless radio frequency (RF) data communication. Examples of RF communication include wide area cellular networks (e.g., for mobile services), local area network access (e.g., WiFi® connectivity), broadcast television, global positioning system (GPS) navigation, and so forth. Typically, different forms of RF communication use different portions of the radio spectrum. While many portions of the radio spectrum are allocated and/or licensed (or assigned) for particular uses, there remain portions that are underutilized. Such underutilized portions of the radio spectrum may be leveraged for various forms of RF communication, such as those listed above, and on an unlicensed basis.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for spread spectrum wireless over non-contiguous blocks of RF (herein referred to as "channels") are described. In at least some embodiments, a set of channels is selected for wireless communication, with at least some of the channels being non-contiguous (e.g., non-adjacent) from one another. A spreading sequence is selected, such as based on attributes of a selected set of channels. Communication data that is to be transmitted over the set of channels is combined with the spreading sequence to generate a spread spectrum signal. The spread spectrum signal is then divided into multiple sub-signals for transmission over the set of channels.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
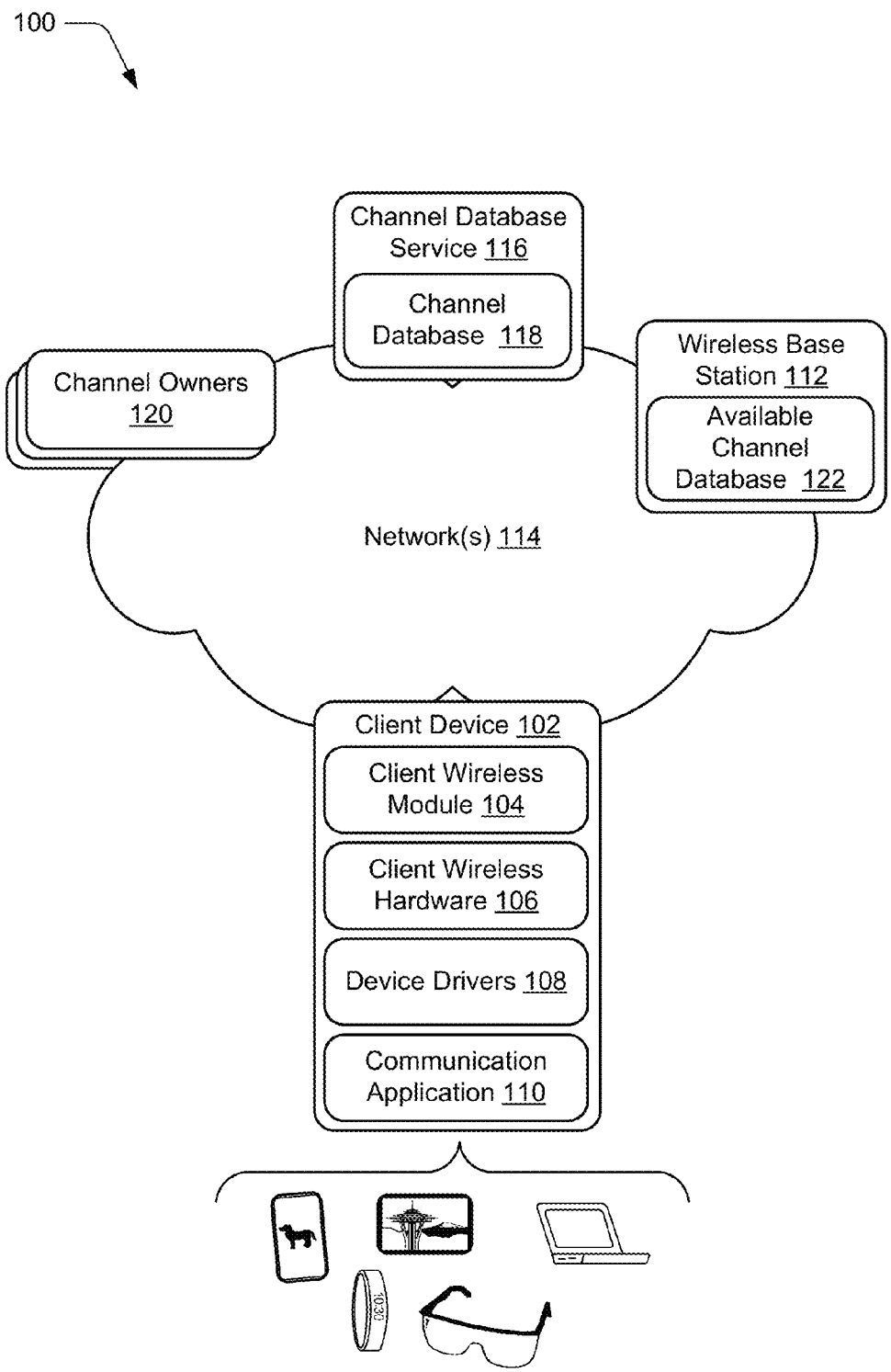
FIG. 1 is an illustration of an environment in an example implementation that is operable to employ techniques discussed herein in accordance with one or more embodiments.

Techniques for spread spectrum wireless over non-contiguous channels are described. In at least some embodiments, a set of channels is selected for wireless communication, with at least some of the channels being non-contiguous (e.g., non-adjacent) from one another. For instance, some of the channels may be separated by portions of the radio frequency (RF) spectrum not included in the set of channels, such as other wireless channels. The set of channels may be selected from various portions of the RF spectrum, such as unassigned portions of the RF spectrum (e.g., television (TV) white spaces), guard bands between licensed portions of the RF spectrum, RF spectrum allocated for access on an unlicensed basis, unused or underutilized portions of licensed RF spectrum, and so forth. Further, implementations enable channels from different regions of the RF spectrum to be used together for wireless communication.

According to various implementations, a spreading sequence is selected based on attributes of a selected set of channels. For instance, the spreading sequence may be proportional to a combined bandwidth of the set of channels. The combined bandwidth, for example, is determined by representing the set of channels as a single contiguous channel, even though at least some of the channels are non-contiguous. Communication data that is to be transmitted over the set of channels is combined with the spreading sequence using any suitable modulation technique to generate a spread spectrum signal. The spread spectrum signal is then divided into multiple sub-signals for transmission over the set of channels. For instance, the spread spectrum signal is processed by an inverse multiplexer to generate multiple sub-signals.

According to various implementations, a device that receives the multiple sub-signals over the set of channels may then combine the sub-signals to generate a combined signal. The combined signal is processed to separate the communication data from the spreading sequence. The communication data, for instance, may be a portion of a communication session, such as a voice call, a video session, an exchange of content, and so forth.

Thus, implementations provide ways of leveraging non-contiguous channels for spread spectrum communication techniques. Such implementations may provide for increased bandwidth by leveraging available channels across different portions of the RF spectrum. Further, average transmission power over a set of channels may be decreased since multiple channels are being used to provide for increased bandwidth. Still further, underutilized portions of the RF spectrum may be leveraged for spread spectrum techniques, such as white spaces, guard bands, unlicensed channels, and so forth. Thus, interference with signal traffic in licensed channels may be mitigated, such as by reducing transmission power in individual channels and utilizing channels that avoid high-traffic licensed channels.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for spread spectrum wireless over non-contiguous channels in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for spread spectrum wireless over non-contiguous channels. Environment 100 includes a client device 102 which can be embodied as any suitable device such as, by way of example and not limitation, a smartphone, a tablet computer, a portable computer (e.g., a laptop), a desktop computer, and so forth. One of a variety of different examples of a computing device 102 is shown and described below in FIG. 12.

The computing device 102 of FIG. 1 is illustrated as including a client wireless module 104, which is representative of functionality to enable the computing device 102 to communicate wirelessly with other devices and/or entities. The client wireless module 104 can be configured to enable data communication via a variety of different wireless techniques and protocols. Examples of such techniques and/or protocols include mobile cellular communications (e.g., 3G, 4G, Long Term Evolution (LTE), and so forth), near field communication (NFC), short-range wireless connections (e.g., Bluetooth), local area wireless networks (e.g., one or more standards in compliance with IEEE 802.11), wide area fixed wireless networks (e.g., one or more standard in compliance with IEEE 802.16), wireless telephone networks, and so on. For instance, the client wireless module 104 is configured to perform various aspects of techniques for spread spectrum wireless over non-contiguous channels discussed herein.

The client device 102 further includes client wireless hardware 106, which is representative of various hardware components that can be employed to enable the client device 102 to communicate wirelessly. Examples of the client wireless hardware 106 include radio transmitters, radio receivers, various types and/or combinations of antennas, impedance matching functionality, and so on. In at least some embodiments, the client device 102 is a multi-radio device that can communicate via different wireless technologies and/or protocols.

Further included as part of the computing device 102 are one or more device drivers 108, which are representative of functionality to enable the computing device 102 to interact with various devices, and vice-versa. For instance, the device drivers 108 can enable interaction between various functionalities of the computing device 102 (e.g., an operating system, applications, services, and so on) and different devices of the client device 102, such as input/output (I/O) devices. The device drivers 108, for instance, can enable interaction between the client wireless module 104 and the client wireless hardware 106 to enable the client device 102 to transmit and receive wireless signals.

In at least some embodiments, the client device 102 is configured to communicate with other devices and/or entities via a communication application 110. Generally, the communication application 110 is representative of functionality to enable different forms of communication via the client device 102. Examples of the communication application 110 include a voice communication application (e.g., a Voice over Internet Protocol (VoIP) client), a video communication application, a messaging application, a content sharing application, and combinations thereof. The communication application 110, for instance, enables different communication modalities to be combined to provide diverse communication scenarios. In at least some implementations, the communication data discussed herein is generated by the communication application 110.

The environment 100 further includes a wireless base station 112, which is representative of a radio receiver and transmitter that serves as a hub for at least some wireless portions of network(s) 114. In at least some embodiments, the wireless base station 112 may serve as a gateway between wired and wireless portions of the network(s) 114. The wireless base station 112 also includes functionality for performing various aspects of the techniques for spread spectrum wireless over non-contiguous channels discussed herein, which are discussed in detail below. According to one or more embodiments, the wireless base station 112 includes functionality for wireless communication via a variety of different wireless technologies and protocols, examples of which are discussed elsewhere herein. Examples of the wireless base station 112 include an access point (AP) for a wireless local access network (WLAN), an AP for a wide area network (WAN), a cellular base station, a satellite base station, and so forth.

Generally, the network 114 is representative of a single network or a combination of different interconnected networks. In at least some embodiments, the network 114 represents different portions of the radio spectrum that may be leveraged for wireless communication. The network 114, for instance, represents radio spectrum in different frequency bands, such as ultra-high frequency (UHF), super-high frequency (SHF), and so forth. The network 114 may also represent a combination of wireless and wired networks and may be configured in a variety of ways, such as a wide area network (WAN), a local area network (LAN), the Internet, and so forth.

The environment 100 further includes a channel database service 116, which is representative of functionality to track and/or manage various attributes of wireless channels. The channel database service 116, for instance, can track channel utilization for different wireless channels, e.g., whether a particular wireless channel is in use and/or is available to be used for wireless communication, level of channel usage for different channels, and so forth. The channel database service 116 may track and monitor various other attributes of wireless channel, such as channel quality, signal-to-noise ratios for different channels, noise floor in particular channels, and so forth. For example, the channel database service 116 maintains a channel database 118 that stores status information for different wireless channels. As further detailed below, the channel database service 116 may provide channel information from the channel database 118 to different entities (e.g., the wireless base station 112 and/or the client device 102) to enable wireless channels to be selected for wireless communication.

In at least some embodiments, the channel database service 116 receives information regarding wireless channels from channel owners 120. Generally, the channel owners 120 are representative of different entities that have certain rights and/or privileges to different portions of the radio spectrum. For instance, the channel owners 120 may represent licensees of certain portions of the radio spectrum in a particular market and/or markets, such as television networks, cellular carriers, radio stations, and so forth. The channel owners 120 may also represent entities that are granted exclusive or shared access to particular frequency bands, such as government organizations, emergency services, academic and/or research entities, and so forth. Generally, licenses and privileges for access to different portions of the radio spectrum are regulated by government organizations, such as the Federal Communications Commission (FCC) in the United States, the Office of Communications (OFCOM) in the United Kingdom, and so forth.

Wireless channels tracked by the channel DB 118 may occur in various regions of the RF spectrum, such as regions associated with broadcast television, cellular communications, satellite communications, short-range wireless communications, and so forth.

As further illustrated in the environment 100, the wireless base station 112 includes an available channel database 122, which is representative of a database of wireless channels that are available for wireless communication in the network 114. The available channel database 122, for instance, can be populated with channel information received from the channel database service 116. In at least some embodiments, available channel information from the available channel database 122 can be propagated to the client device 102 to enable a channel and/or channels to be selected for wireless communication. Further details concerning identification and selection of wireless channels are presented below.

According to implementations discussed herein, techniques can be employed to establish wireless data communication between the client device 102 and other devices utilizing a variety of different wireless data communication techniques and/or protocols. For instance, channels that are identified in the available channel database 122 may be leveraged for wireless communication via various wireless standards, such as cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16 or 802.22), wireless telephone networks, satellite communications, and so on. This is not intended to be limiting, however, and a wide variety of different wireless techniques and protocols may be utilized in accordance with the disclosed embodiments.

Having described an example environment in which the techniques described herein may operate, consider now a discussion of some example implementation scenarios in accordance with one or more embodiments.

Example Implementation Scenarios

The following discussion describes example implementation scenarios for spread spectrum wireless over non-contiguous channels in accordance with one or more embodiments. In portions of the following discussion, reference will be made to the environment 100 of FIG. 1.

Figure 2:
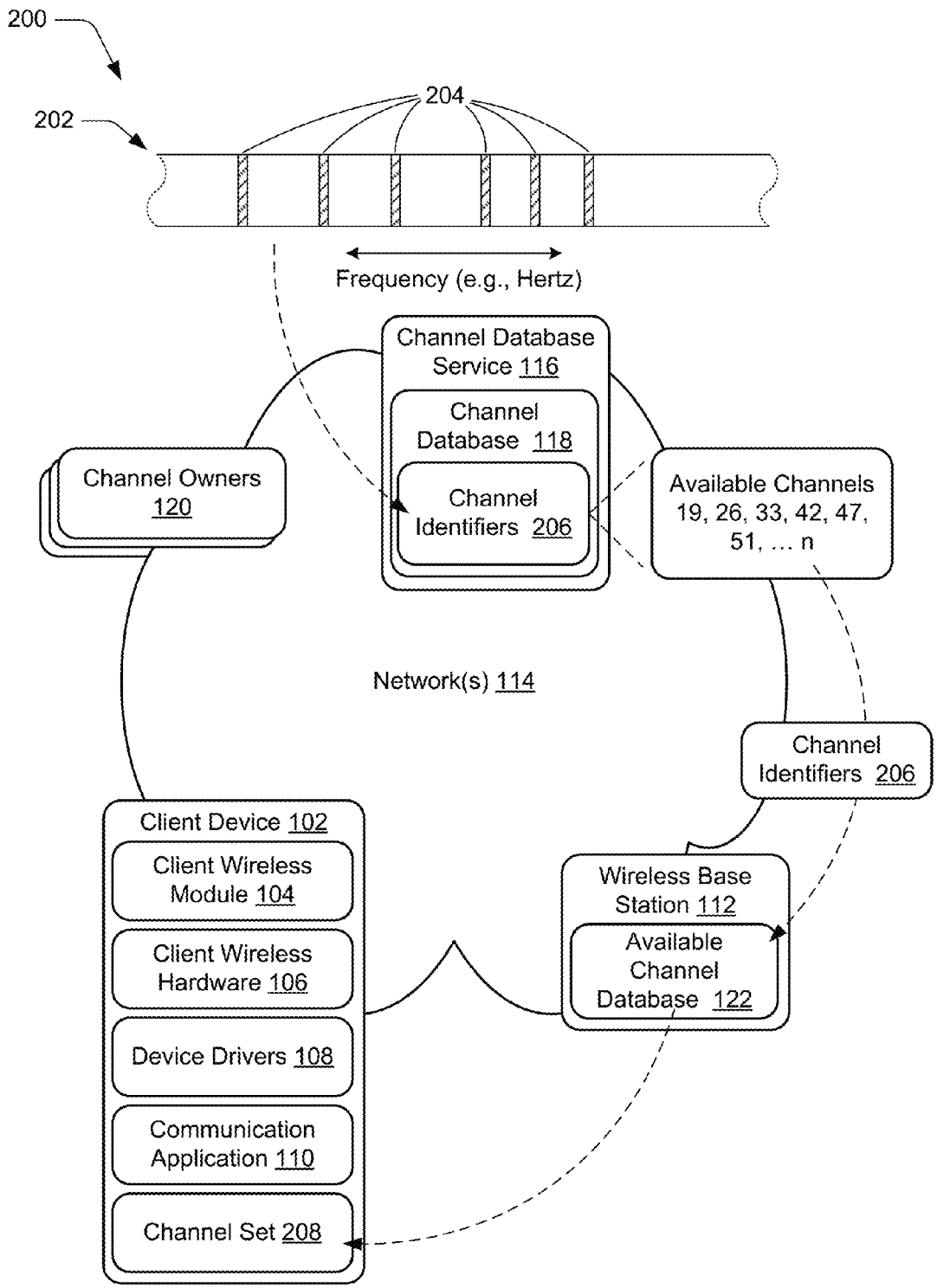
FIG. 2 illustrates an example implementation scenario for determining available wireless channels in accordance with one or more embodiments.

FIG. 2 illustrates an example implementation scenario 200 for determining available wireless channels in accordance with one or more embodiments.

In the scenario 200, the channel database service 116 determines that a spectrum portion 202 of the radio spectrum includes a set of available channels 204. Generally, the available channels 204 correspond to channels that are available for wireless communication in a geographical region of the wireless base station 112.

The channel database service 116 may determine the available channels 204 in a variety of different ways. For instance, channel owners 120 for individual of the respective channels 204 may notify the channel database service 116 of the available channels 204. Alternatively or additionally, the channel database service 116 may query the channel owners 120 as to whether their respective channels are being utilized. As yet another example, the channel database service 116 may detect that the available channels are not being leveraged for signal communication, e.g., for a licensed use.

As an example implementation, consider that the available channels 204 include "white spaces" in the spectrum portion 202 of the radio spectrum. The available channels 204, for instance, may be licensed to particular channel owners 120 and/or allocated for particular uses. The available channels 204, however, are not currently in use. For example, the available channels 204 correspond to discrete wireless channels that are licensed to particular channel owners 120 but are not being utilized for their licensed purpose. In at least some embodiments, the channel owners 120 for the respective available channels 204 may notify the channel database service 116 as such.

As an addition or alternative to white spaces, the available channels 204 may include various other types of channels and/or regions of the RF spectrum, such as guard bands between licensed portions, licensed channels, and so forth. Thus, the available channels 204 generally correspond to wireless channels that are available for wireless communication in a particular geographical region.

Further to the scenario 200, the channel database service 116 stores channel identifiers 206 for the available channels 204 as part of the channel DB 118. According to various implementations, the channel DB 118 stores channel identifiers for various wireless channels that are available in different geographical regions.

The channel database service 116 then communicates the channel identifiers 206 to the wireless base station 112, which stores the channel identifiers 206 as part of the available channel DB 122. According to various implementations, the channel DB service 116 may communicate channel identifiers for available wireless channels to the wireless base station 112 periodically, such as according to a pre-specified time period. Alternatively or additionally, the channel DB service 116 may communicate channel identifiers to the wireless base station 112 in response to various events, such as a query from the wireless base station 112 for available channels.

Further to the scenario 200, the wireless base station 112 selects a channel set 208 for the client device 102. The channel set 208, for instance, corresponds to a subset of the available channels 204 and is selected based on one or more criteria, such as a bandwidth requirement of the client device 102. Generally, the channel set 208 is selected from the available channel DB 122 and includes channel identifiers 206 for individual channels of the channel set 208. The wireless base station 112 communicates the channel set 208 to the client device 102, such as in response to a query from the client device 102 for available channels, as part of a proprietary information element, as part of a wireless action frame, and so forth. The channel set 208 may identify available channels in various ways, such as with reference to frequency ranges for the individual channels, channel numbers for the individual channels (e.g., assigned based on a regional band plan), and so forth.

According to various implementations, the wireless base station 112 may also inform that client device 102 of allowed transmission power levels for individual channels of the channel set 208. A maximum transmission power, for instance, may be specified for individual channels to mitigate interference with communication in adjacent channels, such as licensed uses of channels that are in proximity to the channels 204.

In at least some implementations, the client device 102 (e.g., via the client wireless module 104) can query the wireless base station 112 for available channels on a periodic basis (e.g., every 24 hours) and/or in response to various events, such as an initiation of a communication session via the communication application 110. The client device 102 stores the channel set 208 and may utilize one or more channels identified in the channel set 208 to initiate and/or participate in wireless data communication according to techniques for spread spectrum wireless over non-contiguous channels discussed herein.

Figure 3:
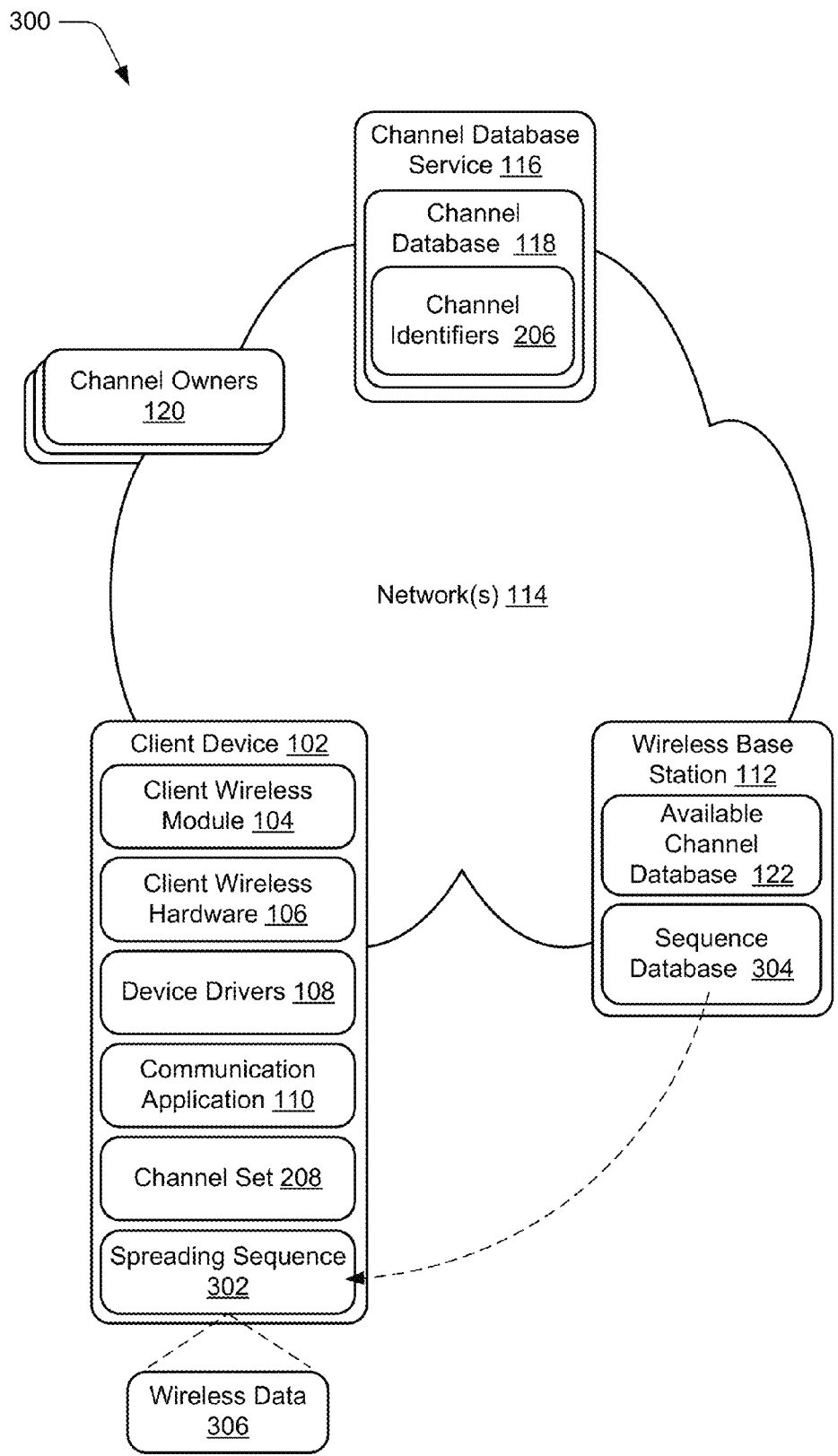
FIG. 3 illustrates an example implementation scenario for obtaining a spreading sequence for processing wireless data in accordance with one or more embodiments.

FIG. 3 illustrates an example implementation scenario 300 for obtaining a spreading sequence for processing wireless data in accordance with one or more embodiments. According to various implementations, the scenario 300 represents a continuation and/or extension of the scenario 200.

In the scenario 300, the wireless base station 112 generates a spreading sequence 302 and communicates the spreading sequence 302 to the client device 102. Generally, the spreading sequence 302 represents a sequence of bits that is used to process wireless data before it is transmitted by the client device 102. In at least some implementations, the spreading sequence 302 represents a pseudorandom binary sequence (PRBS), such as a pseudo-noise (PN) sequence. The spreading sequence 302, for instance, is generated by the wireless base station 112 utilizing any suitable direct-sequence spread spectrum (DSSS) technique. According to various implementations, different client devices that communicate via the wireless base station 112 are each provided with different spreading sequences.

In at least some implementations, the spreading sequence 302 is generated based on a bandwidth of the channel set 208. For instance, the channel set 208 combines to provide a particular total bandwidth, such as in megahertz (MHz). Since the wireless base station 112 has knowledge of the channel set 208 and the bandwidth provided by the channel set 208, the wireless base station 112 generates the spreading sequence 302 to accommodate the bandwidth.

According to one or more implementations, the wireless base station 112 includes a sequence database (DB) 304 that stores different instances of spreading sequences. Thus, the spreading sequence 302 may be selected from the sequence DB 304, such as based on a number of channels in the channel set 302 and an estimated bandwidth to be utilized by the client device 102 for wireless communication. The spreading sequence 302, for instance, may correspond to a previously-generated spreading sequence that is selected for the client device 102.

Continuing with the scenario 300, the client device 102 receives the spreading sequence 302 and utilizes the spreading sequence 302 to process communication data for wireless transmission. The client wireless module 104, for instance, applies the spreading sequence 302 to generate wireless data 306 for transmission over the channel set 208 according to techniques for spread spectrum wireless over non-contiguous channels discussed herein. Example ways of generating the wireless data 306 with the spreading sequence 302 are detailed below. For instance, consider the follow implementation scenario.

Figure 4:
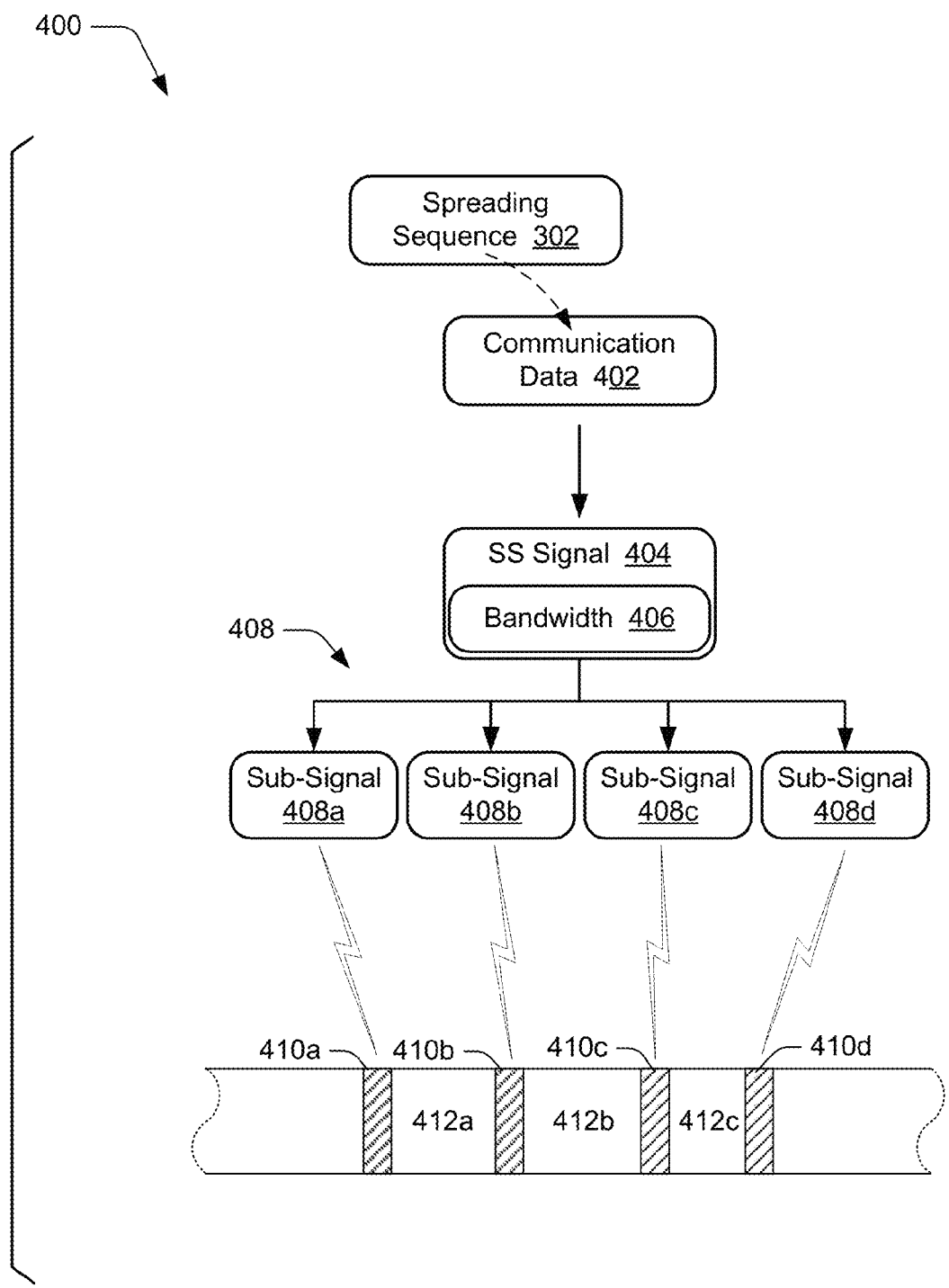
FIG. 4 illustrates an example implementation scenario for processing communication data using a spreading sequence in accordance with one or more embodiments.

FIG. 4 illustrates an example implementation scenario 400 for processing communication data using a spreading sequence in accordance with one or more embodiments. According to various implementations, the scenario 400 represents a continuation and/or extension of the scenarios 200, 300.

In the upper portion of the scenario 400, the spreading sequence 302 is applied to communication data 402. The communication data 402, for instance, represents a digital bit stream of communication data, such as voice data, video data, messaging data (e.g., text), content data, and/or combinations thereof. For example, the communication data 402 represents a portion of a communication session, such as a voice call, a video call, a Unified Communications (UC) session, and so forth.

According to various implementations, applying the spreading sequence 302 includes combining the spreading sequence 302 with the communication data 402. For instance, the spreading sequence 302 may be combined with the communication data 402 via modulo addition, multiplication, and so forth. Thus, the communication data 402 is modulated using the spreading sequence, such as via direct-sequence spread spectrum (DSSS), code division multiple access (CDMA), and/or any other suitable modulation technique.

Application of the spreading sequence 302 to the communication data 402 generates a spread spectrum (SS) signal 404. Generally, the SS signal 404 has a bandwidth 406 that is equal to the bandwidth provided by the combined channels of the channel set 208. For instance, consider that the channel set 208 provides a combined bandwidth of 24 MHz. As indicated above, the spreading sequence 302 is generated based on the bandwidth of the channel set 208. Accordingly, in this particular example applying the spreading sequence 302 to the communication data 402 generates the SS signal 404 with a bandwidth 406 of 24 MHz.

Continuing with the scenario 400, the SS signal 404 is divided into multiple sub-signals 408 for transmission over the channel set 208. The sub-signals 408 include a sub-signal 408a, a sub-signal 408b, a sub-signal 408c, and a sub-signal 408d. The SS signal 404, for instance, is processed by an inverse-multiplexer (IMUX) based on the number of channels in the channel set 208. For example, consider that the channel set 208 includes four 6 MHz channels 410a, 410b, 410c, and 410d. Notice that the channels 410a-410d are non-contiguous, e.g., are separated by intervening channels and/or RF regions 412a, 412b, 412c that are not included in the channel set 208. Accordingly, the SS signal 404 is divided into four 6 MHz sub-signals 408a, 408b, 408c, and 408d. The sub-signals 408a-408d are then wirelessly transmitted over respective channels 410a-410d of the channel set 208. According to various implementations, the power used to transmit the sub-signals 408a-408d over the respective channels 410a-410d is determined based on permitted power level information supplied by the wireless base station 112, e.g., along with identifiers for the channels 410a-410d.

Figure 5:
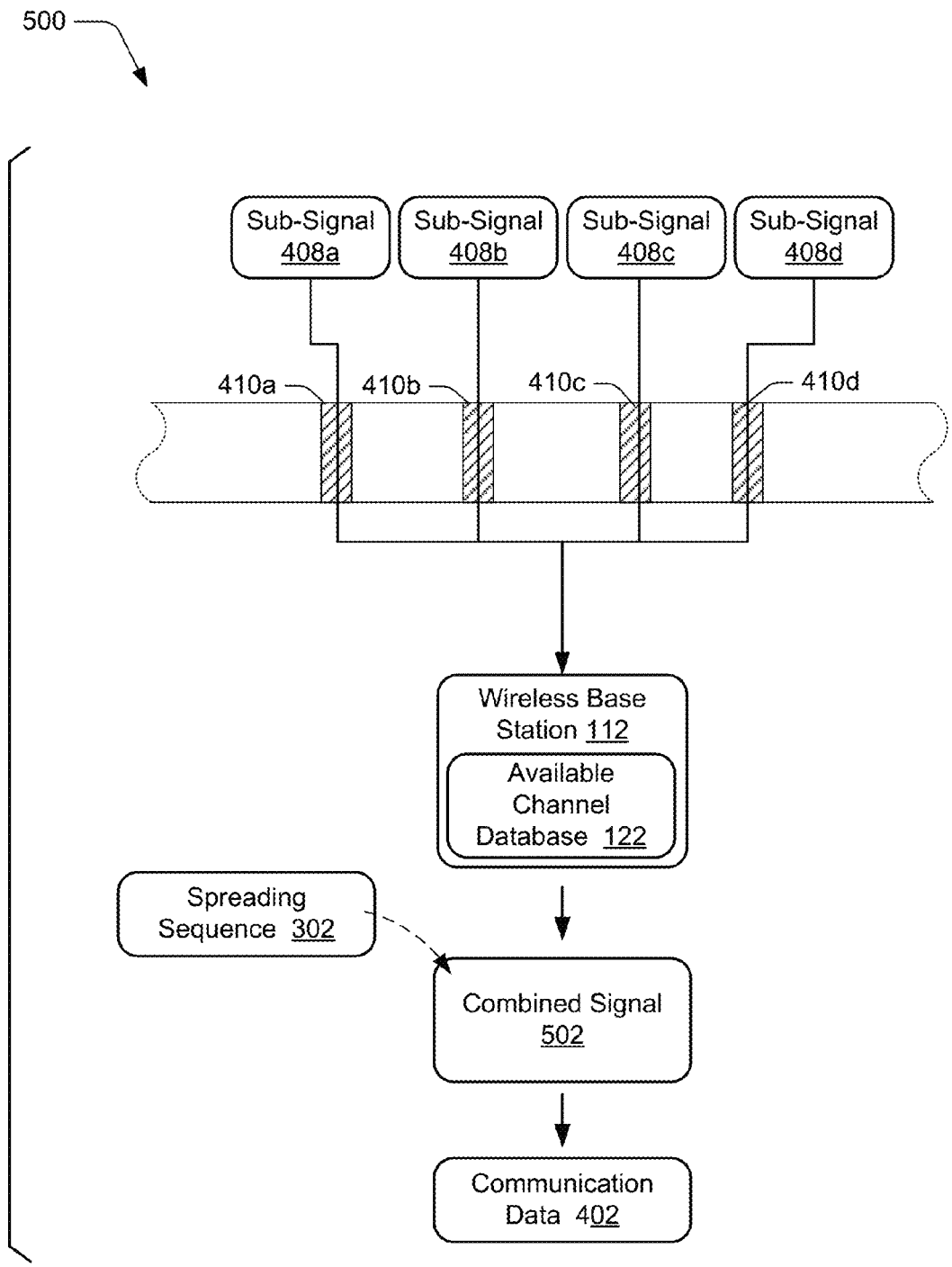
FIG. 5 illustrates an example implementation scenario for extracting communication data from a spread spectrum signal in accordance with one or more embodiments.

FIG. 5 illustrates an example implementation scenario 500 for extracting communication data from a spread spectrum signal in accordance with one or more embodiments. According to various implementations, the scenario 500 represents a continuation and/or extension of the scenarios 200, 300, 400.

In the upper portion of the scenario 500, the sub-signals 408a-408d are received at the wireless base station 112 over the respective channels 410a-410d, e.g., in response to the client device transmitting the sub-signals 408a-408d over the channels 410a-410d. The wireless base station 112 combines the sub-signals 408a-408d to recreate the SS signal 404, discussed above. For instance, the wireless base station 112 multiplexes the sub-signals 408a-408d to generate a combined signal 502. The combined signal 502, for instance, is identical to the SS signal 404. The wireless base station 112 then demodulates the combined signal 502 using the spreading sequence 302 to extract the communication data 402. The communication data 402 may then be communicated from the wireless base station 112 to another entity, such as another client device as part of a communication session.

According to various implementations, the example scenarios described above may be performed periodically and/or in response to various events. For instance, the scenario 200 may be performed according to a particular time period (e.g., every 12 hours, every 24 hours, and so forth) to provide the client device 102 with an updated channel set, e.g., to replace or supplement the channel set 208. In at least some implementations, an updated channel set may include different channels, a different number of channels, different channel types (e.g., channel bandwidths), and so forth. Accordingly, in response to an updated channel set being provided to the client device 102, the scenario 300 may be implemented to provide an updated spreading sequence that reflects the characteristics of the updated channel set. The updated spreading sequence, for instance, is based on the combined bandwidth of the channels included in the updated channel set. Thus, the updated channel set and the updated spreading sequence may be utilized for wireless communication, such as described with reference to the scenarios 400, 500. Accordingly, techniques described herein are dynamically adaptable to changes in available channels and changing channel characteristics.

The implementation scenarios described above are presented for purpose of example only, and it is to be appreciated that techniques discussed herein may be employed in a variety of other implementation scenarios within the spirit and scope of the claimed implementations. Having discussed some example implementation scenarios, consider now some example procedures in accordance with one or more embodiments.

Example Procedures

The following section describes some example procedures for spread spectrum wireless over non-contiguous channels in accordance with one or more implementations. The procedures, for instance, describe example ways of implementing various aspects of the example implementation scenarios described above. This is not to be construed as limiting, however, and the procedures may be employed in a variety of other implementation scenarios within the spirit and scope of the claimed embodiments.

Figure 6:
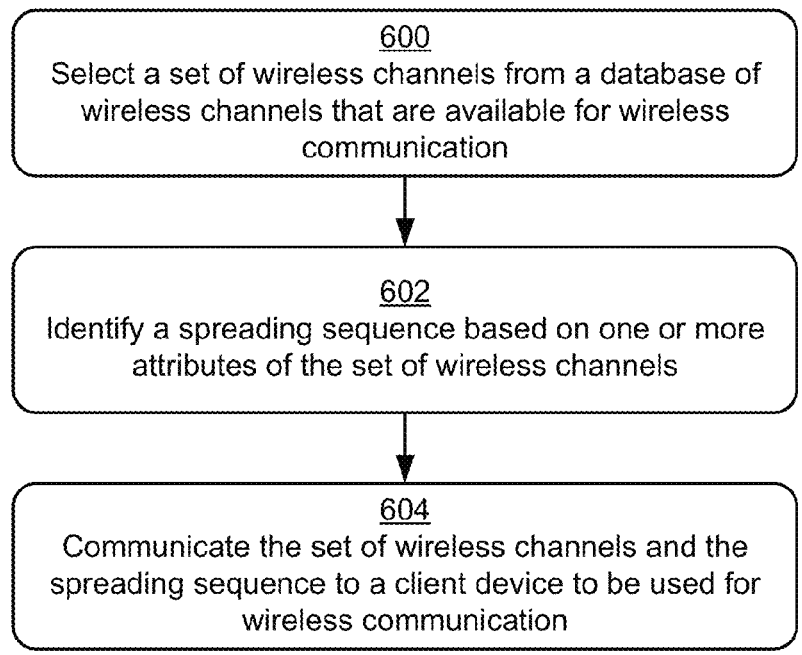
FIG. 6 is a flow diagram that describes steps in a method for identifying a set of wireless channels and a spreading sequence in accordance with one or more embodiments.

FIG. 6 is a flow diagram that describes steps in a method for identifying a set of wireless channels and a spreading sequence in accordance with one or more embodiments. In at least some implementations, the method may be performed by a wireless infrastructure component, such as the wireless base station 112.

Step 600 selects a set of wireless channels from a database of wireless channels that are available for wireless communication. For example, a set of wireless channels is selected for the client device 102 by the wireless base station 112 from the available channel DB 122. The set of wireless channels may be selected based on various criteria, such as estimated bandwidth requirement, channel quality, combined channel bandwidth, and so forth. For instance, the client device 102 may query the wireless base station 112 for wireless channels for performing wireless communication, such as voice communication, video communication, content sharing, and so forth. Based on attributes of the wireless communication (e.g., estimated bandwidth needed to exchange communication data), the wireless base station 112 selects a set of channels that can be combined to meet the needed bandwidth. As discussed above, the set of wireless channels includes non-contiguous channels, e.g., channels that have at least one intervening RF region that is not included in the set of channels.

Step 602 identifies a spreading sequence based on one or more attributes of the set of wireless channels. The spreading sequence, for instance, is selected based on a combined bandwidth of the set of wireless channels. As referenced above, the wireless base station 112 may select the spreading sequence from the sequence DB 304, which includes a collection of different spreading sequences. Alternatively or additionally, the wireless base station 112 may dynamically generate the spreading sequence based on various attributes of a set of wireless channels and/or attributes of data communication for which the spreading sequence will be utilized.

Step 604 communicates the set of wireless channels and the spreading sequence to a client device to be used for wireless communication. The wireless base station 112, for instance, communicates the set of wireless channels and the spreading sequence to the client device 102. Communicating wireless channels and a spreading sequence may occur periodically (e.g., according to a particular time period) and/or in response to various events. For instance, the client device 102 may query for a set of wireless channels for wireless communication. In response, the client device 102 may return a set of the wireless channels and a spreading sequence to be used for data communication over the set of wireless channels.

Alternatively or additionally, wireless channels and spreading sequences may be broadcast, such as via a dedicated broadcast channel, a proprietary information element, a custom action frame (e.g., an 802.11 action frame), and so forth.

Figure 7:
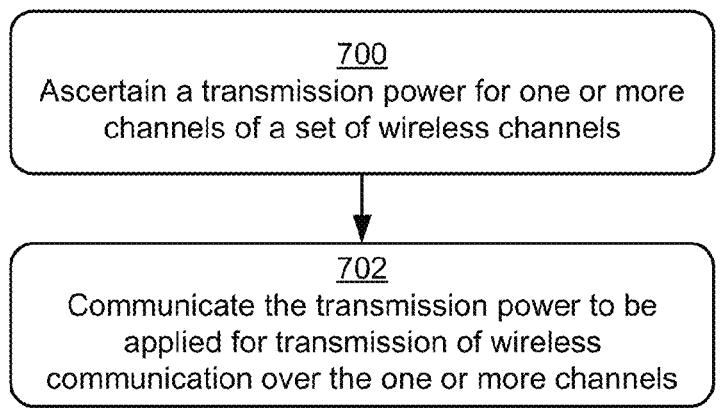
FIG. 7 is a flow diagram that describes steps in a method for specifying a transmission power for a wireless channel in accordance with one or more embodiments.

FIG. 7 is a flow diagram that describes steps in a method for specifying a transmission power for a wireless channel in accordance with one or more embodiments. In at least some implementations, the method may be performed by a wireless infrastructure component, such as the wireless base station 112. The method, for instance, represents an extension of the method described above with reference to FIG. 6.

Step 700 ascertains a transmission power for one or more channels of a set of wireless channels. Generally, the transmission power specifies a maximum permitted transmission power over a particular channel and/or set of channels. The transmission power, for instance, may be ascertained based on information received from a channel authority, such as the channel DB service 116, a channel owner 120, and so forth. According to various implementations, the transmission power may be indicated to mitigate interference with one or more adjacent channels.

Step 702 communicates the transmission power to be applied for transmission of wireless communication over the one or more channels. The wireless base station 112, for instance, communicates the transmission power to the client device 102. The transmission power, for instance, may be communicated along with identifiers for the set of wireless channels and/or a spreading spectrum to be used with the set of wireless channels. In at least some implementations, transmission power for individual channels of the set of wireless channels may be communicated, and at least some of the individual channels may be associated with different transmission power values.

Figure 8:
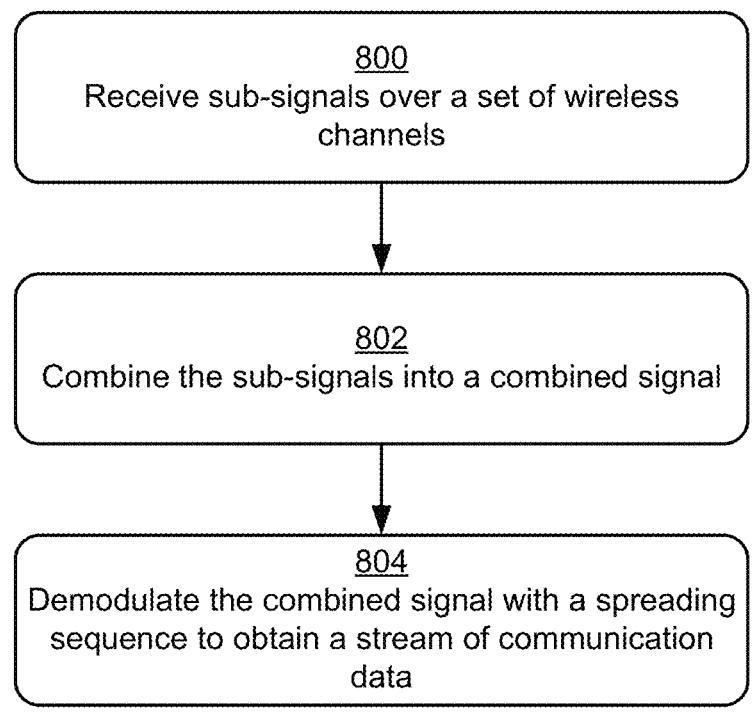
FIG. 8 is a flow diagram that describes steps in a method for retrieving communication data from a modulated signal in accordance with one or more embodiments.

FIG. 8 is a flow diagram that describes steps in a method for retrieving communication data from a modulated signal in accordance with one or more embodiments. In at least some implementations, the method may be performed by a wireless infrastructure component, such as the wireless base station 112. The method, for instance, represents an extension of the methods described above with reference to FIGS. 6 and 7.

Step 800 receives sub-signals over a set of wireless channels. For instance, each sub-signal is received over a separate channel of the set of wireless channels. The set of wireless channels, for example, correspond to a set of wireless channels that were previously communicated to a client device from which the sub-signals are received. According to various implementations, the set of wireless channels include one or more non-contiguous channels.

Step 802 combines the sub-signals into a combined signal. The sub-signals, for instance, are multiplexed into a single signal.

Step 804 demodulates the combined signal with a spreading sequence to obtain a stream of communication data. For instance, the wireless base station 112 identifies a particular spreading sequence, such as based on an identifier for a client device from which the sub-signals are received. The wireless base station 112, for example, ascertains that a particular spreading sequence was communicated to the client device 102 from which the sub-signals are received, and thus utilizes the particular spreading sequence to demodulate the combined signal. Generally, demodulation of the combined signal separates the spreading sequence from the communication data. The communication data, for instance, corresponds to a bit stream of digital communication data, such as voice data, video data, content data, and so forth. According to one or more implementations, the wireless base station 112 may communicate the communication data to another entity, such as a different client device, another base station, another network, and so forth.

Figure 9:
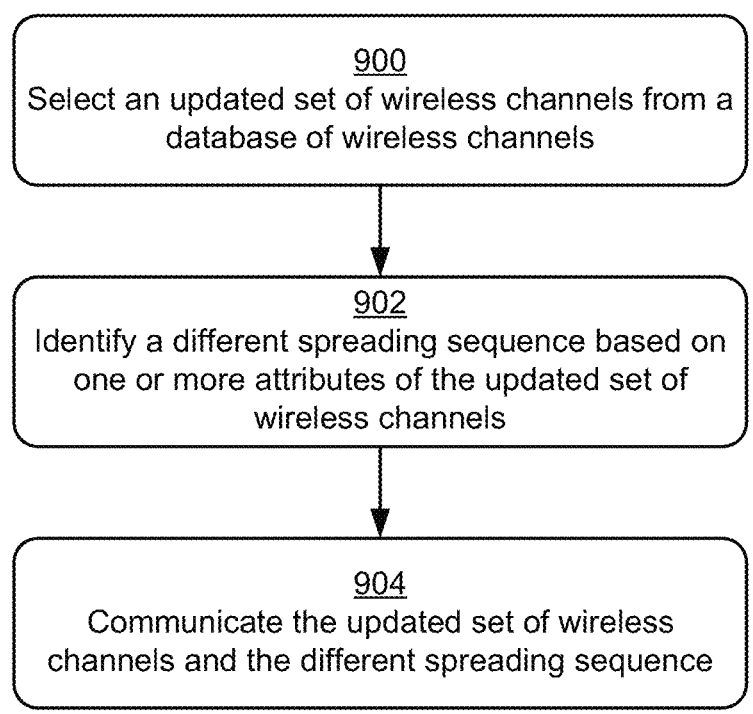
FIG. 9 is a flow diagram that describes steps in a method for updating a channel set usage in accordance with one or more embodiments.

FIG. 9 is a flow diagram that describes steps in a method for updating a channel set in accordance with one or more embodiments. In at least some implementations, the method may be performed by a wireless infrastructure component, such as the wireless base station 112. The method, for instance, represents an extension of the methods described above with reference to FIGS. 6-8.

Step 900 selects an updated set of wireless channels from a database of wireless channels. For instance, the wireless base station 112 selects an updated set of wireless channels from the available channel DB 112 to be communicated to the client device 102. The updated set may be selected for various reasons. For instance, one or more channels communicated in a previous set of wireless channels may no longer be available and/or may be determined to have insufficient signal quality to be used for wireless communication. As another example, the channel DB service 116 may communicate updated channels to the wireless base station 112, which then updates the available channel DB 122.

In yet a further example, the client device 102 may request an updated set of wireless channels. For instance, the client device 102 may experience quality issues with a current set of wireless channels, such as limited bandwidth and/or signal quality degradation. Thus, the client device 102 may request an updated set of channels to restore a previous level of wireless service. Alternatively or additionally, the client device 102 may request additional and/or higher-bandwidth channels, such as for a high-bandwidth activity. For instance, the client device 102 may ascertain that a video conference is occurring or is scheduled to occur, and thus may request a higher-bandwidth set of channels than is currently provided by a current set of channels, e.g., to provide sufficient bandwidth for the video conference.

Step 902 identifies a different spreading sequence based on one or more attributes of the updated set of wireless channels. The different spreading sequence, for instance, is different than a spreading sequence previously provided for a previous set of channels. As described above, the different spreading sequence may be selected based on various attributes of the wireless channels, such as a combined bandwidth provided by the set of wireless channels.

Step 904 communicates the updated set of wireless channels and the different spreading sequence. For instance, the updated set of wireless channels and the spreading sequence are communicated to a client device to be used to replace a previously-communicated set of wireless channels and spreading sequence. The wireless base station 112, for example, may communicate the set of wireless channels and the spreading sequence to the client device 102, along with instructions to use the set of wireless channels and the spreading sequence to replace a previous set of wireless channels and spreading sequence.

Figure 10:
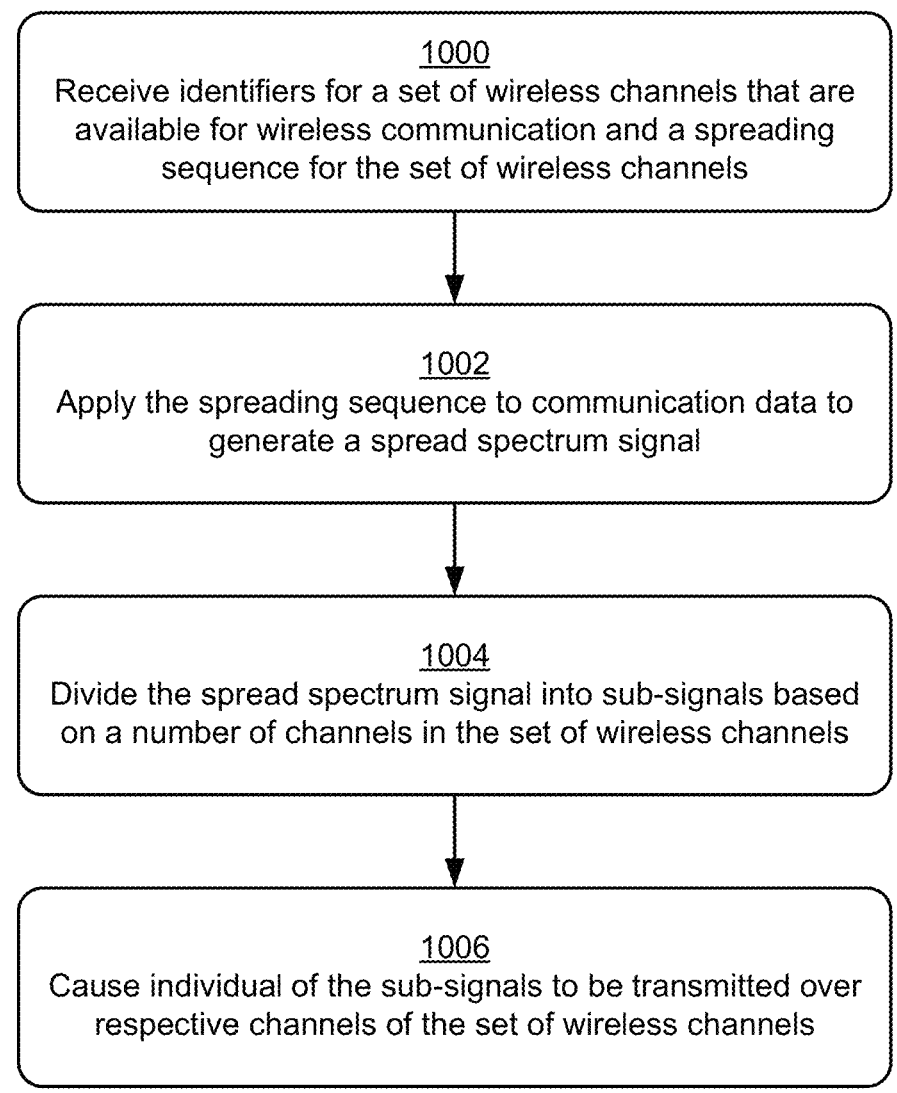
FIG. 10 is a flow diagram that describes steps in a method for applying a spreading sequence over a set of channels in accordance with one or more embodiments.

FIG. 10 is a flow diagram that describes steps in a method for applying a spreading sequence over a set of channels in accordance with one or more embodiments. In at least some implementations, the method may be performed by a wireless client device, such as the client device 102.

Step 1000 receives identifiers for a set of wireless channels that are available for wireless communication and a spreading sequence for the set of wireless channels. The wireless channels, for instance, include one or more non-contiguous channels. The identifiers and the spreading sequence, for instance, are received responsive to a query for wireless channels for wireless communication, such as from the client device 102.

In at least some implementations, a permitted transmission power for one or more of the wireless channels is also received. For instance, different transmission powers may be received for individual channels of the set of wireless channels.

Step 1002 applies the spreading sequence to communication data to generate a spread spectrum signal. Applying the spreading sequence, for instance, includes modulating the communication data utilizing the spreading sequence to generate the spread spectrum signal. In at least some implementations, the set of wireless channels is represented as a single contiguous wireless channel with a bandwidth of the combined set of wireless channel for purposes of modulating the communication data with the spreading sequence.

Step 1004 divides the spread spectrum signal into sub-signals based on a number of channels in the set of wireless channels. The spread spectrum signal, for instance, is inverse multiplexed based on the number of channels in the set of wireless channels to generate the sub-signals.

Step 1006 causes individual of the sub-signals to be transmitted over respective channels of the set of wireless channels. The client device 102, for instance, transmits each sub-signal over a different channel of the set of wireless channels.

In at least some implementations, individual sub-signals are transmitted according to a transmission power specified for a respective channel. For instance, different channels may have different permitted transmission power values, and thus actual applied transmission power for the different sub-signals may vary. According to one or more implementations, the client wireless module 104 may communicate various communication parameters to the client wireless hardware 106 and/or the device drivers 108 to enable transmission of the sub-signals over the set of wireless channels.

Figure 11:
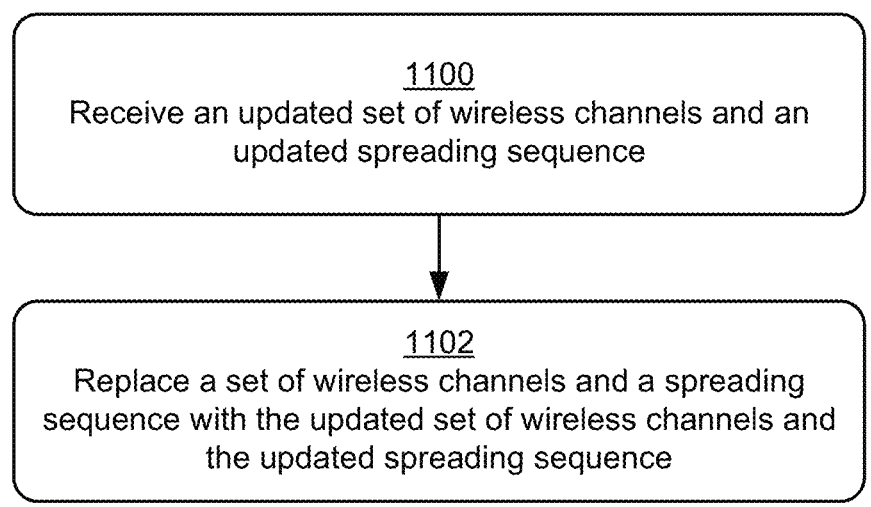
FIG. 11 is a flow diagram that describes steps in a method for replacing a set of channels in accordance with one or more embodiments.

FIG. 11 is a flow diagram that describes steps in a method for replacing a set of channels in accordance with one or more embodiments. In at least some implementations, the method may be performed by a wireless client device, such as the client device 102. The method, for instance, describes an example extension and/or variation on the method described above with reference to FIG. 10.

Step 1100 receives an updated set of wireless channels and an updated spreading sequence. The updated wireless channels and spreading sequence may be received periodically and/or in response to various events, examples of which are discussed above. According to various implementations, the updated set of wireless channels includes one or more non-contiguous channels.

Step 1102 replaces a set of wireless channels and a spreading sequence with the updated set of wireless channels and the updated spreading sequence. For instance, a previously-provided set of wireless channels and corresponding spreading sequence are replaced for use in transmitting further communication data. Thus, the updated set of wireless channels and the updated spreading sequence may be used for modulating and transmitting communication data, such as according to techniques discussed above.

Having discussed some example procedures, consider now a discussion of an example system and device in accordance with one or more embodiments.

Example System and Device

Figure 12:
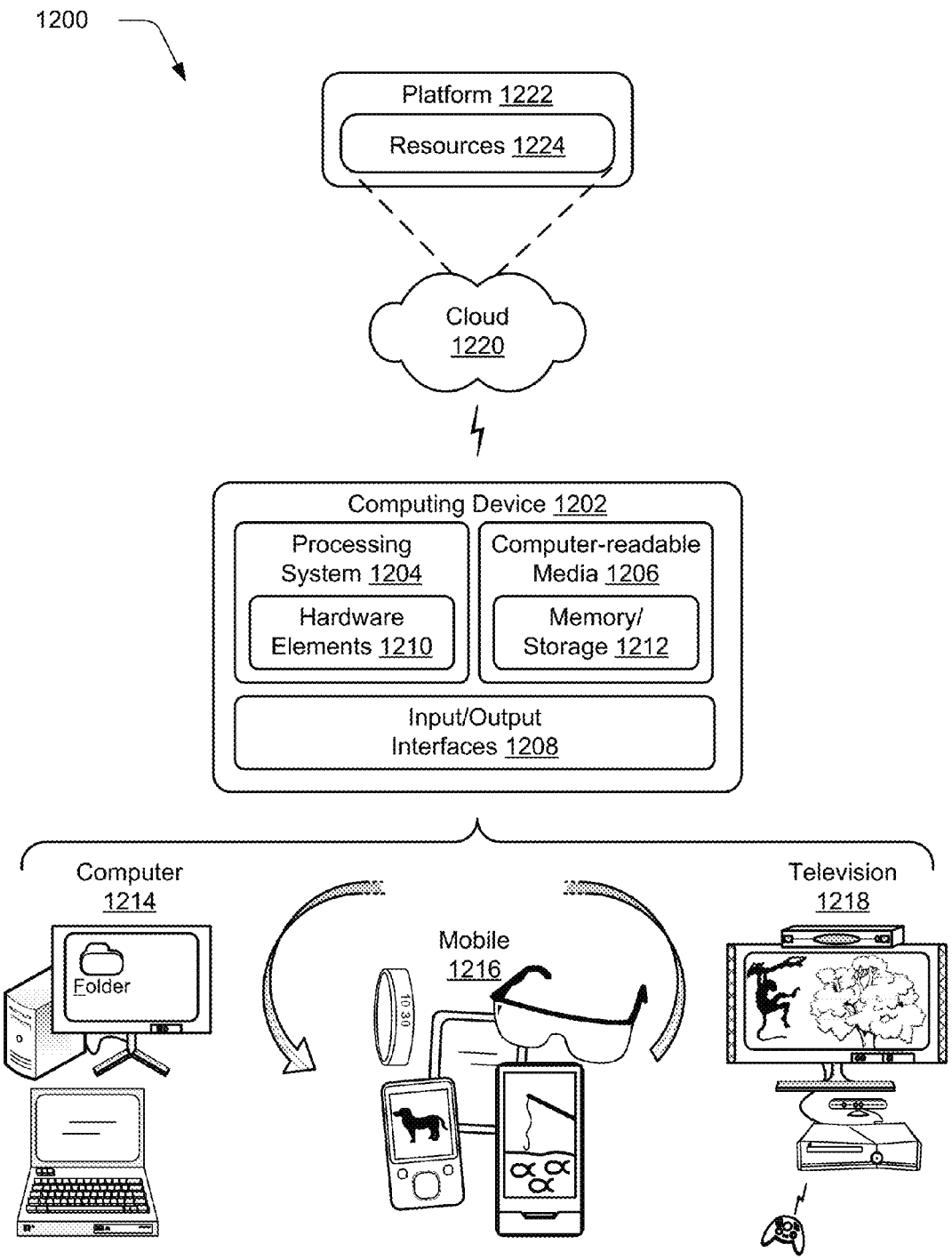
FIG. 12 illustrates an example system and computing device as described with reference to FIG. 1, which are configured to implement embodiments of techniques described herein.

FIG. 12 illustrates an example system generally at 1200 that includes an example computing device 1202 that is representative of one or more computing systems and/or devices that may implement various techniques described herein. For example, the client device 102 and/or the wireless base station 112 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more I/O Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, a wearable device, a portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. For example, functionalities discussed with reference to the client device 102, the wireless base station 112, and/or the channel database service 116 may be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or WiFi® network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for spread spectrum wireless over non-contiguous channels are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage media storing computer-executable instructions that are executable by the one or more processors to perform operations including:
      receiving identifiers for a set of wireless channels that are available for wireless communication and a spreading sequence for the set of wireless channels, the wireless channels including one or more non-contiguous channels;
      applying the spreading sequence to communication data to generate a spread spectrum signal;
      dividing the spread spectrum signal into sub-signals based on a number of channels in the set of wireless channels; and
      causing individual of the sub-signals to be transmitted over respective channels of the set of wireless channels.

2. A system as described in claim 1, wherein said receiving is responsive to a query for wireless channels for wireless communication.

3. A system as described in claim 1, wherein said receiving further comprises receiving a permitted transmission power for one or more of the wireless channels, and wherein said causing comprises causing a particular sub-signal of the multiple sub-signals to be transmitted based on the permitted transmission power.

4. A system as described in claim 1, wherein said applying comprises modulating the communication data utilizing the spreading sequence to generate the spread spectrum signal.

5. A system as described in claim 1, wherein said applying comprises representing the set of wireless channels as a single wireless channel with a bandwidth of the combined set of wireless channels.

6. A system as described in claim 1, wherein said dividing comprises inverse multiplexing the spread spectrum signal to generate the sub-signals.

7. A system as described in claim 1, wherein dividing comprises dividing the spread spectrum signal into a number of sub-signals that corresponds to the number of channels in the set of wireless channels.

8. A system as described in claim 1, wherein the operations further include:
   receiving an updated set of wireless channels and an updated spreading sequence, the updated set of wireless channels including one or more non-contiguous channels; and
   replacing the set of wireless channels and the spreading sequence with the updated set of wireless channels and the updated spreading sequence for use in transmitting further communication data.

9. A computer-implemented method comprising:
   selecting a set of wireless channels from a database of wireless channels that are available for wireless communication, the set of wireless channels including one or more non-contiguous channels;
   identifying a spreading sequence based on one or more attributes of the set of wireless channels;
   communicating the set of wireless channels and the spreading sequence for a receipt by a client device to be used for wireless communication;
   receiving a request for an updated set of one or more wireless channels;
   selecting an updated set of one or more wireless channels from the database of wireless channels;
   identifying a different spreading sequence based on one or more attributes of the updated set of one or more wireless channels; and
   communicating the updated set of one or more wireless channels and the different spreading sequence to be used by the client device for wireless communication.

10. The computer-implemented method as described in claim 9, wherein the set of wireless channels includes one or more white spaces.

11. The computer-implemented method as described in claim 9, wherein said identifying comprises identifying the spreading sequence based on a combined bandwidth of the set of wireless channels.

12. The computer-implemented method as described in claim 9, wherein said identifying comprises selecting the spreading sequence from a database of spreading sequences.

13. The computer-implemented method as described in claim 9, wherein the updated set of one or more wireless channels is selected based on a change in one or more of channel availability or channel attributes in the database of wireless channels.

14. The computer-implemented method as described in claim 9, further comprising:
   receiving sub-signals over the set of wireless channels;
   combining the sub-signals into a combined signal; and
   demodulating the combined signal with the spreading sequence to obtain a stream of communication data.

15. The computer-implemented method as described in claim 9, wherein the request for an updated set of one or more wireless channels includes a request for one or more of:
   at least one additional channel in addition to the set of wireless channels; or
   at least one channel that has a higher bandwidth than one or more channels of the set of wireless channels.

16. A computer-implemented method comprising:
   selecting a set of wireless channels that include one or more non-contiguous channels;
   identifying a spreading sequence based on a combined bandwidth of the set of wireless channels;
   communicating the set of wireless channels and the spreading sequence to a client device to be used for wireless communication;
   selecting an updated set of wireless channels based on an indication of a change in one or more of channel availability or channel attributes of one or more channels in the set of wireless channels;
   identifying a different spreading sequence based on one or more attributes of the updated set of wireless channels; and communicating the updated set of wireless channels and the different spreading sequence to be used to replace the set of wireless channels and the spreading sequence.

17. The computer-implemented method as described in claim 16, further comprising:
ascertaining a transmission power for one or more channels of the updated set of wireless channels; and
communicating the transmission power to be applied for transmission of wireless communication over the one or more channels of the updated set of wireless channels.

18. The computer-implemented method as described in claim 16, further comprising:
receiving sub-signals over the updated set of wireless channels;
combining the sub-signals into a combined signal; and
demodulating the combined signal with the spreading sequence to obtain a stream of communication data.

19. The computer-implemented method as described in claim 16, wherein the indication of the change in one or more of channel availability or channel attributes indicates that the one or more channels of the set of wireless channels has an insufficient signal quality.

20. The computer-implemented method as described in claim 16, wherein said selecting the updated set of wireless channels is further based on a request from the client device for an updated set of wireless channels.

* * * * *